United States Patent [19]

Maeda et al.

[11] Patent Number: 5,062,091
[45] Date of Patent: Oct. 29, 1991

[54] MAGNETO-OPTICAL RECORDING METHOD AND APPARATUS CAPABLE OF OVERWRITING DATA USING A RADIATION BEAM

[75] Inventors: Takeshi Maeda, Kokubunji; Norio Ohta, Iruma; Yoshio Suzuki, Kodaira; Masahiko Takahashi, Hachioji, all of Japan

[73] Assignee: Hitachi, Ltd., Tokyo, Japan

[21] Appl. No.: 362,098

[22] Filed: Jun. 6, 1989

[30] Foreign Application Priority Data

Jun. 8, 1988 [JP] Japan ................... 63-139391

[51] Int. Cl.$^5$ .................. G11B 7/12; G11B 11/12; G11B 13/04
[52] U.S. Cl. ....................... 369/13; 369/54; 369/58; 369/59; 369/47
[58] Field of Search ............ 369/13, 54, 58, 59, 369/47, 32; 360/114, 59; 365/122

[56] References Cited

U.S. PATENT DOCUMENTS

| | | | |
|---|---|---|---|
| 4,698,697 | 10/1987 | Okano | 369/32 X |
| 4,761,775 | 8/1988 | Murakami | 369/32 X |
| 4,819,218 | 4/1989 | Barnard | 369/59 X |

FOREIGN PATENT DOCUMENTS

| | | |
|---|---|---|
| 60-251539 | 12/1985 | Japan . |
| 60-261051 | 12/1985 | Japan . |
| 61-22452 | 1/1986 | Japan . |
| 61-175948 | 8/1986 | Japan . |
| 62-110673 | 5/1987 | Japan ............ 369/13 |

OTHER PUBLICATIONS

Extended Abstract (the 34th Spring Meeting, 1987), the Japan Society of Applied Physics and Related Societies, No. 3, 28P-ZL-3.

"Operating Margins for Magnetic-Optic Recording Materials with Direct Overwrite Capability", Shieh et al., IEEE Trans. on Magnetics, vol. MAG-23, No. 1, Jan. 1987, pp. 171-173.

Primary Examiner—Stuart S. Levy
Assistant Examiner—Hoa Nguyen
Attorney, Agent, or Firm—Antonelli, Terry, Stout & Kraus

[57] ABSTRACT

A magneto-optical recording medium having a magnetic film having magnetization normal to a plane thereof and having a number of prepits preformed in an optically detectable form at a predetermined interval along a track is prepared. Areas between the prepits are defined as recording areas in which data is to be recorded. A clock signal having a predetermined frequency is generated in synchronism with a reproduced signal corresponding to the prepits of the magneto-optical record medium in response to the reproduced signal. A radiation pulse having an energy corresponding to a signal having a predetermined pattern is irradiated to the magneto-optical record medium in accordance with the clock signal to record the predetermined pattern in at least one of the recording areas prior to code data to be recorded. A phase difference ($\delta_2$) between the reproduced signal corresponding to the recorded predetermined pattern and the clock signal is detected and a difference ($\delta_1 - \delta_2$) between the phase difference ($\delta_2$) and a phase difference ($\delta_1$) between the reproduced signal corresponding to the signal recorded in the recording area and the clock signal is detected. The clock signal is corrected in accordance with the detected difference.

14 Claims, 7 Drawing Sheets

MAGNETO-OPTICAL RECORDING METHOD AND APPARATUS CAPABLE OF OVERWRITING DATA USING A RADIATION BEAM

BACKGROUND OF THE INVENTION

The present invention relates to a method of magneto-optical recording and an apparatus therefor, and more particularly to a method for recording magneto-optical information capable of overwriting (writing new data directly on old data) by merely irradiating a radiation beam such as a laser beam without applying an external modulation magnetic field, and an apparatus therefor such as an overwritable magneto-optical disk system.

As an overwriting method in the magneto-optical disk system, a magnetic field modulation system and a light modulation system have been known. In the magnetic field modulation system, an external magnetic field is applied to a magneto-optical recording film while the application area is heated by an irradiation beam energy to reverse magnetization of the magneto-optical recording film so that the overwriting is attained. (For example, JP-A-60-251539, JP-A-60-261051, JP-A-61-22452).

On the other hand, as the overwriting method by the light modulation system, a two-layer magnetic film method (Sato et al. Extended Abstracts (The 34th Spring Meeting, 1987), The Japan Society of Applied Physics and Related Societies, No. 3,28 p-ZL-3, p. 721, and JP-A-62-175948), and a demagnetizing field method Shiek et al., (IEEE trans. Magnetics , Vol. MAG-23, No. 1, January 1987, pp. 171–173) have been reported. In the light modulation overwriting method which uses the demagnetizing field described in the above reference, the overwriting is effected by only the irradiation of a laser beam without applying an external magnetic field. Namely, a recording magnetic domain is formed by a recording laser pulse having a predetermined time duration, and an erasing laser pulse having a shorter time duration than the recording laser pulse is irradiated to the recording magnetic domain to erase the recorded data.

Of the prior art methods described above, the magnetic field modulation overwriting method needs high speed switching of the applied magnetic field. Accordingly, it is difficult to write at a recording frequency above 10 MHz and hence it is not suitable for high speed recording.

On the other hand, in the light modulation overwriting method which uses the two-layer magnetic film, magnetic properties of both magnetic layers such as compensation temperatures and coercive forces must be in a particular narrow range. Accordingly, the media which can be used are limited and the control of the media characteristic is difficult to attain.

In the light modulation overwriting method which uses the demagnetizing field, the overwriting is not attained unless the data is overwritten at the exact position of the pre-written recording magnetic domain. In a self-clocking system used in a conventional optical disk system, a recording clock signal is generated by a frequency-fixed crystal oscillator. Accordingly, if there is an eccentricity in the disk or a variation in a rotating speed, the writing timing may deviate by several microseconds. Thus, it does not assure a sufficient precision required by the overwriting.

SUMMARY OF THE INVENTION

It is an object of the present invention to provide a method of magneto-optical recording which has no shift in the write timing and which allows exact and high speed overwriting, and an apparatus therefor.

In accordance with the present invention, synchronization is done by a buried clocking system and a radiation beam modulated by only recording information to be newly written, independently from the previous recording magnetic domain, is irradiated onto the previous recording magnetic domain at an exact timing.

In the overwriting method which uses the demagnetizing field, it is necessary that the write timing assures precisions of less than one-half of the previously written magnetic domain position and a magnetic domain diameter. More precise control of the recording domain position on the track is attained by the buried clocking system than by the self-clocking system. Such a technique has been proposed by the inventors of the present application in U.S. Ser. No. 266,769 filed on Nov. 3, 1988, now abandoned, of which the disclosure is incorporated herein by reference.

By the use of the buried clocking system, the shift of the write timing due to the eccentricity of the disk and the variation of the rotating speed can be reduced, and the recording magnetic domain can be written more precisely than it is by the self-clocking system. However, a reproduced signal corresponding to the recording magnetic domain formed on the magneto-optical recording media by the recording pulse generated by using the clock signal produced by the buried clocking system, is not synchronous with the clock signal but there is a time shift therebetween. Accordingly, this method does not provide a sufficient precision required by the overwriting method which uses the demagnetizing field. Where a radiation pulse having a large energy is irradiated to form a recording magnetic domain (for example, where a code "1" is to be overwritten on a code "0" or a code "1" is to be overwritten on a code "1" where the code "1" represents an area at which the recording magnetic domain is formed and the code "0" represents an area at which the recording magnetic domain is not formed), there is no problem because an allowable range of the shift of the record timing is large. However, where a radiation pulse having a small energy is irradiated to erase the previous recording magnetic domain (that is, where a code "0" is to be overwritten on a code "1"), the allowable range of the shift of the record timing is small and hence it is necessary to irradiate the radiation pulse at a precise timing to the position of the previous recording magnetic domain.

A reason for the time shift will be discussed later. A problem arises particularly when the record medium has been reloaded after the previous recording and before the new overwriting, or when the record medium recorded by one recording unit is overwritten by another recording unit. Since one of advantages of the magneto-optical record medium is that it is removable and portable, the above case may frequently occur.

In accordance with the present invention, the radiation beam modulated by only the recording information to be newly written, independently from the previous recording magnetic domain, is irradiated to effect the overwriting. Accordingly, it is necessary to control the record timing so that the stable overwriting is attained even when the allowable range of the shift of the record timing is severest, that is, even when the radiation pulse having a small energy is irradiated to erase the previous recording magnetic domain.

In accordance with the present invention, the record timing in the overwrite mode is precisely controlled. Accordingly, the shift of the record timing is avoided even for the reloaded record medium or the record medium recorded by another recording unit, and the overwriting is attained precisely, stably and quickly.

In accordance with the present invention, the method of magneto-optical recording comprises the steps of:

preparing a magneto-optical recording medium having a magnetic film having magnetization normal to a plane thereof and having a number of prepits preformed in an optically detectable form at a predetermined interval along a track, areas between the prepits being defined as recording areas in which a data is to be recorded;

generating a clock signal having a predetermined frequency in synchronism with a reproduced signal corresponding to said prepits of said magneto-optical record medium in response to said reproduced signal;

irradiating to said magneto-optical recording medium a radiation pulse having an energy corresponding to a signal having a predetermined pattern in accordance with said clock signal to record said predetermined pattern in at least one of said recording areas prior to code data to be recorded;

detecting a phase difference ($\delta_2$) between the reproduced signal corresponding to the recorded predetermined pattern and said clock signal and detecting a difference ($\delta_1 - \delta_2$) between said phase difference ($\delta_2$) and a phase difference ($\delta_1$) between the reproduced signal corresponding to the signal recorded in said recording area and said clock signal;

correcting said clock signal in accordance with the detected difference;

irradiating, in accordance with the corrected clock, a radiation pulse having a large energy in a recording magnetic domain formation area and a radiation pulse having a small energy in a recording magnetic domain non-formation area in accordance with the code data to be recorded, to the recording areas following to the recording area in which said predetermined pattern was recorded;

whereby said code data is overwritten by a demagnetizing field of said magneto-optical record medium.

In accordance with the present invention, the magneto-optical recording apparatus comprises:

a magneto-optical recording medium having a magnetic field having magnetization normal to a plane thereof and having a number of prepits preformed in an optically detectable form at a predetermined interval along a track, areas between the prepits being defined as recording areas in which data is to be recorded;

irradiation means for irradiating a radiation beam to said magneto-optical recording medium;

clock signal generation means for generating a clock signal of a predetermined frequency synchronized with a reproduced signal corresponding to the prepits of said magneto-optical recording medium in response to said reproduced signal;

modulation means for modulating the energy of said radiation beam such that said irradiation means irradiates a radiation pulse having a large energy in a recording magnetic domain formation area and irradiates a radiation pulse having a small energy in a recording magnetic domain non-formation area;

record means for supplying a signal having a predetermined pattern and said clock signal to said modulation means prior to code data to be recorded and recording said predetermined pattern in at least one of said recording areas in synchronism with said clock signal;

detection means for detecting a phase difference ($\delta_2$) between the produced signal corresponding to the recorded predetermined pattern and said clock signal and detecting a difference ($\delta_1 - \delta_2$) between said phase difference ($\delta_2$) and a phase difference ($\delta_1$) between the reproduced signal corresponding to the signal recorded in said recording area and said clock signal; and correction means for correcting said clock signal in accordance with the output of said detection means;

said corrected clock and said code data to be recorded being supplied to said modulation means;

said irradiation means irradiating the radiation pulse having the energy corresponding to the code data to be recorded in the recording area following to the recording area in which said predetermined pattern was recorded, in accordance with said corrected clock so that said code data is overwritten by the demagnetizing field of said magneto-optical recording medium.

In accordance with the present invention, in order to attain the overwriting by the demagnetizing field while using the buried clocking system, the magneto-optical record medium having a magnetization film having a normal magnetization to a plane, having a number of prepits in an optically detectable form arranged along tracks at a predetermined interval with areas between the prepits being defined as recording areas in which data are to be recorded, is used. Namely, a number of servo areas and a number of data areas are alternately arranged on the tracks of the magneto-optical record medium. The clock signal is generated from the buried clock pits preformatted in the servo areas, and the record timing is controlled based on the clock signal. In the buried clocking system, N clocks are buried at a constant time interval between two adjacent clock pits. A reproduced signal corresponding to the clock pits in the servo areas is extracted from a read output of the record medium, and it is supplied to a phase locked loop (PLL) circuit, which generates a clock signal having a frequency which is N times as high as the reproduced signal and which is synchronized with the reproduced signal. Radiation beam irradiation means is preferably an optical head which comprises a laser light source driven by a laser driver and an optical system for focusing a laser beam from the laser light source to a fine light spot on the magneto-optical record medium. The buried clock pits may be reproduced by using the laser beam from the optical head as the radiation means. In the servo areas, the laser light source is continuously driven at a low power, a reflected light from the record medium is separated from the light from the laser light source by a polarization beam splitter mounted in the optical head, and the reflected light is sensed by a photo-detector so that the clock pits are reproduced based on a change in the intensity of the reflected light.

In order to record data in the data areas, the radiation pulse of high power is irradiated by the radiation means in accordance with the data to be recorded so that the magnetization film of the magneto-optical record medium is locally heated. The energy of the radiation beam is modulated by the data to be recorded such that the radiation pulse of large energy is irradiated at the position at which the recording magnetic domain is to be formed and the radiation pulse of small energy is irradiated at the position at which the recording magnetic domain is not to be formed. As described above, the reproduced signal corresponding to the recording magnetic domain formed by irradiating to the magneto-optical record medium the radiation pulse modulated by the recording pulse produced based on the clock signal derived from the buried clock pits, is not synchronous with the clock signal and there is a time shift therebetween.

Thus, a shift between the previous recording magnetic domain and the clock signal derived from the prepits (buried clock pits) formed on the record medium is detected. Based on the clock signal, the radiation pulse having the energy corresponding to the signal having a predetermined pattern is irradiated to the magneto-optical record medium to record the predetermined pattern in at least one recording area prior to the recording of code data. A phase difference ($\delta_2$) between the reproduced signal corresponding to the recorded predetermined pattern and the clock signal is detected. A difference ($\delta_1 - \delta_2$) between the phase difference ($\delta_2$) and the phase difference ($\delta_1$) between the reproduced signal corresponding to the signal already recorded in the recording area and the clock signal is detected. The clock signal is corrected based on the detected phase difference. Based on the corrected clock, the radiation pulse having the large energy is irradiated in the recording magnetic domain forming position and the radiation pulse having the small energy is irradiated in the recording magnetic domain non-formation position in accordance with the code data to be recorded, in the recording areas following to the recording area in which the predetermined pattern has been recorded, and the code data is overwritten by the demagnetizing field of the magneto-optical record medium.

In accordance with the present invention, the recording, erasing and overwriting are attained without a biasing magnetic field depending on the magnetic property of the recording film. Normally, a fixed biasing magnetic field which is optimum to the magnetic property of the recording film may be selected and such a magnetic, field may be supplied by a permanent magnet or an electromagnet.

In accordance with the present invention, the overwriting is attained by merely modulating the energy of the radiation beam. Accordingly, the writing at a recording frequency above 10 MHz is easily attained at a high speed. The magnetic property of the magneto-optical record medium may be appropriately selected by properly setting the energy irradiated to the record medium by properly setting the power and the pulse width of the radiation beam. Accordingly, the magnetic property of the medium used can be readily adjusted.

In accordance with the present invention, the previously recorded magnetic domain is read and the shift from the clock signal is detected. Further, the shift between the magnetic domain recorded immediately before the overwriting and the clock signal is detected, and the timing is adjusted based on those shifts. Accordingly, there is no shift in the write timing and the precise overwriting is attained even for the reloaded record medium or the record medium recorded by other recording unit.

DESCRIPTION OF THE PREFERRED EMBODIMENTS

Prior to the explanation of the embodiments of the present invention, a principle of overwriting by the demagnetizing field is explained.

In the overwriting method by the demagnetizing field described in the IEEE Trans. Magnetics referenced above, the states of the magnetic domains to be written are shown in Table 1(a) where a code "1" represents the presence of the recording magnetic domain and a code "0" represents the absence of the recording magnetic domain. A writing light is modulated by three values, that is, non-irradiation, short pulse and long pulse. Which one of them is to be selected depends on the previous recording status. Accordingly, the information previously recorded must be known, and to this end, the data previously recorded must be read before recording. Further, a buffer memory for temporarily storing the information previously recorded and a logic circuit for comparing the previous information with the write information to determine the condition for the write pulse must be incorporated in the system.

However, it has been found that a writing characteristic shown in Table 1(b) is attained if a medium characteristic is properly selected.

TABLE 1

| (a) Prior art overwriting method by demagnetizing field | | |
|---|---|---|
| Laser irradiation condition | Previous recording magnetic domain | |
| | 0 | 1 |
| Non-radiation | 0 | 1 |
| Short pulse | — | 0 |
| Long pulse | 1 | — |

TABLE 1

| (b) Present overwriting method by demagnetizing field | | |
|---|---|---|
| Laser irradiation condition | Previous recording magnetic domain | |
| | 0 | 1 |
| Short pulse | 0 | 0 |

TABLE 1-continued (b) Present overwriting method by demagnetizing field

| Laser irradiation condition | Previous recording magnetic domain | |
|---|---|---|
| | 0 | 1 |
| Long pulse | 1 | 1 |

Referring to FIG. 1, a mechanism of formation or erasure of the recording magnetic domains in the four cases shown in Table 1(b) is explained. This mechanism is described in U.S. Ser. No. 266,769 referenced above.

Figures 1A, 1B, 1C, 1D:
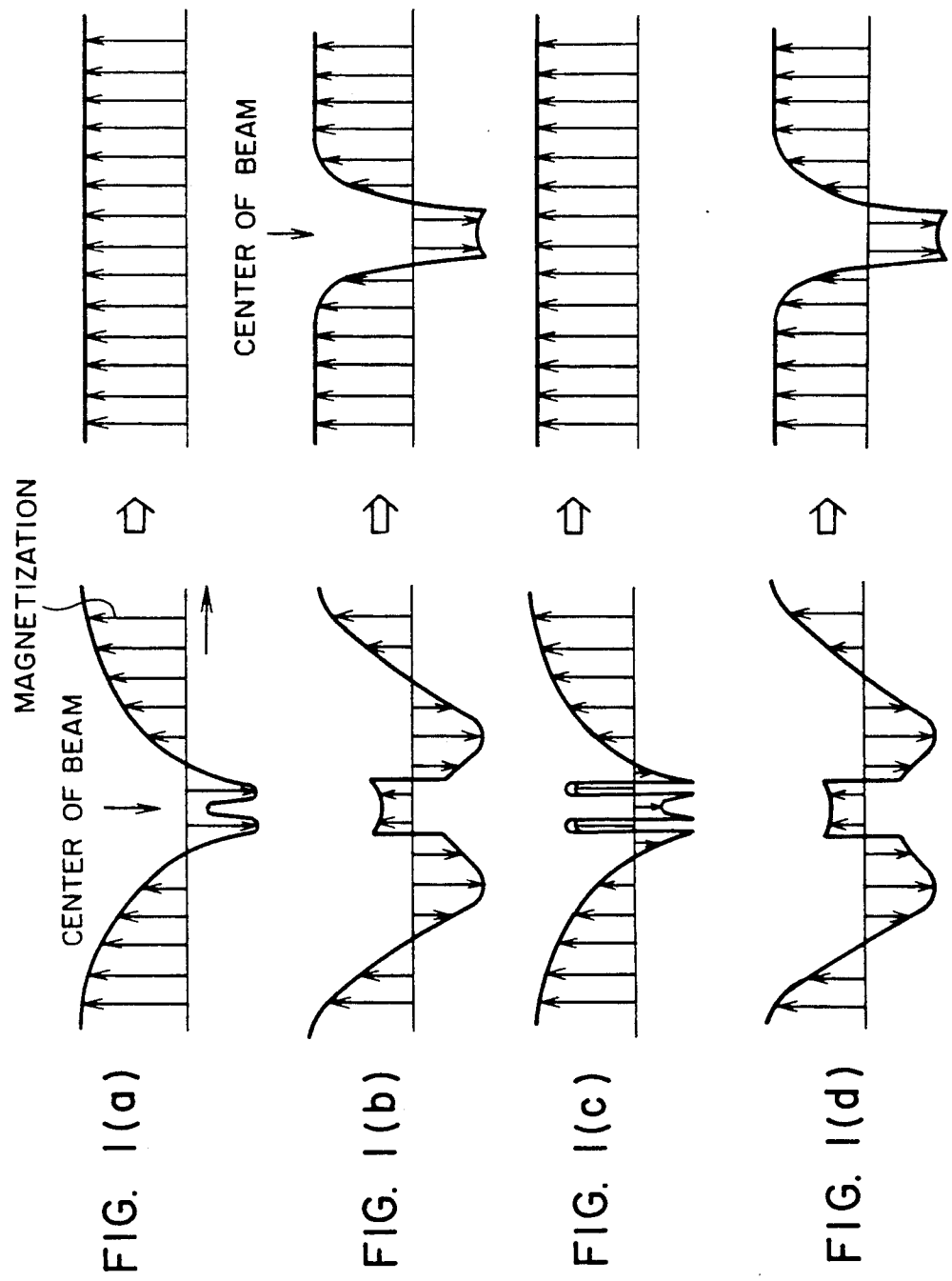
FIGS. 1(a) to 1(d) show magnetization distributions in a magneto-optical recording film when a laser beam is irradiated.

(1) When a low energy radiation pulse (short pulse light) is irradiated to an area where the recording magnetic domain has not been formed previously (FIG. 1(a)):

A reversed magnetic domain is temporarily formed around the spot at the time of irradiation of the radiation pulse, but since it does not reach a stable minimum domain diameter, it is reduced and extinguished in a process of cooling after the radiation pulse has expired. Therefore, the recording magnetic domain is not formed.

(2) When a high energy radiation pulse (long pulse light) is irradiated to an area where the recording magnetic domain has not been formed previously (FIG. 1(b)):

A relatively large demagnetizing domain is temporarily formed by the irradiation of the high energy (long pulse light) and a reversal domain (recording magnetic domain) is formed around the spot by a demagnetizing field from the reversal magnetic domain.

(3) When a low energy radiation pulse (short pulse light) is irradiated to an area where the recording magnetic domain has been formed previously (FIG. 1(c)):

A nucleus of a re-reversal domain is formed around the previous recording magnetic domain and the nucleus is grown so that the previous recording magnetic domain is erased and the magnetization is made uniform.

(4) When a high energy radiation pulse (long pulse light) is irradiated to an area where the recording magnetic domain has been formed previously (FIG. 1(d)):

Because of the high energy radiation pulse (long pulse), a reversal domain (recording magnetic domain) is formed around the spot irrespectively of the previous recording status.

When the record medium having the characteristic shown in Table 1(b) is used, the recording magnetic domain remains after the irradiation of the high energy radiation pulse (long pulse light) and does not remain after the irradiation of the low energy radiation pulse (short pulse light) irrespectively of the previous recording status. As a result, the direct overwriting is attained.

In order to attain the overwriting, it is necessary that the radiation position of the radiation pulse exactly matches to the position of the previously recorded magnetic domain. When the high energy radiation pulse is irradiated to form the recording magnetic domain (reversal magnetic domain) (FIG. 1(b) or FIG. 1(d)), or when the low energy radiation pulse is irradiated to an area where the recording magnetic domain has not been formed previously (FIG. 1(a)), there is no problem because the allowable range of the record timing shift is large. However, when the low energy radiation pulse is irradiated to erase the previous recording magnetic domain (reversal domain) (FIG. 1(c)), the allowable range of the record timing shift is small. In order to attain the overwriting by irradiating the radiation beam modulated depending on only the record information to be newly written, it is necessary to control the record timing to conform to the severest case of the record timing shift. A sufficient precision will not be attained by merely using the buried clocking.

The embodiments of the present invention will now be explained with reference to the drawings.

Figure 2:
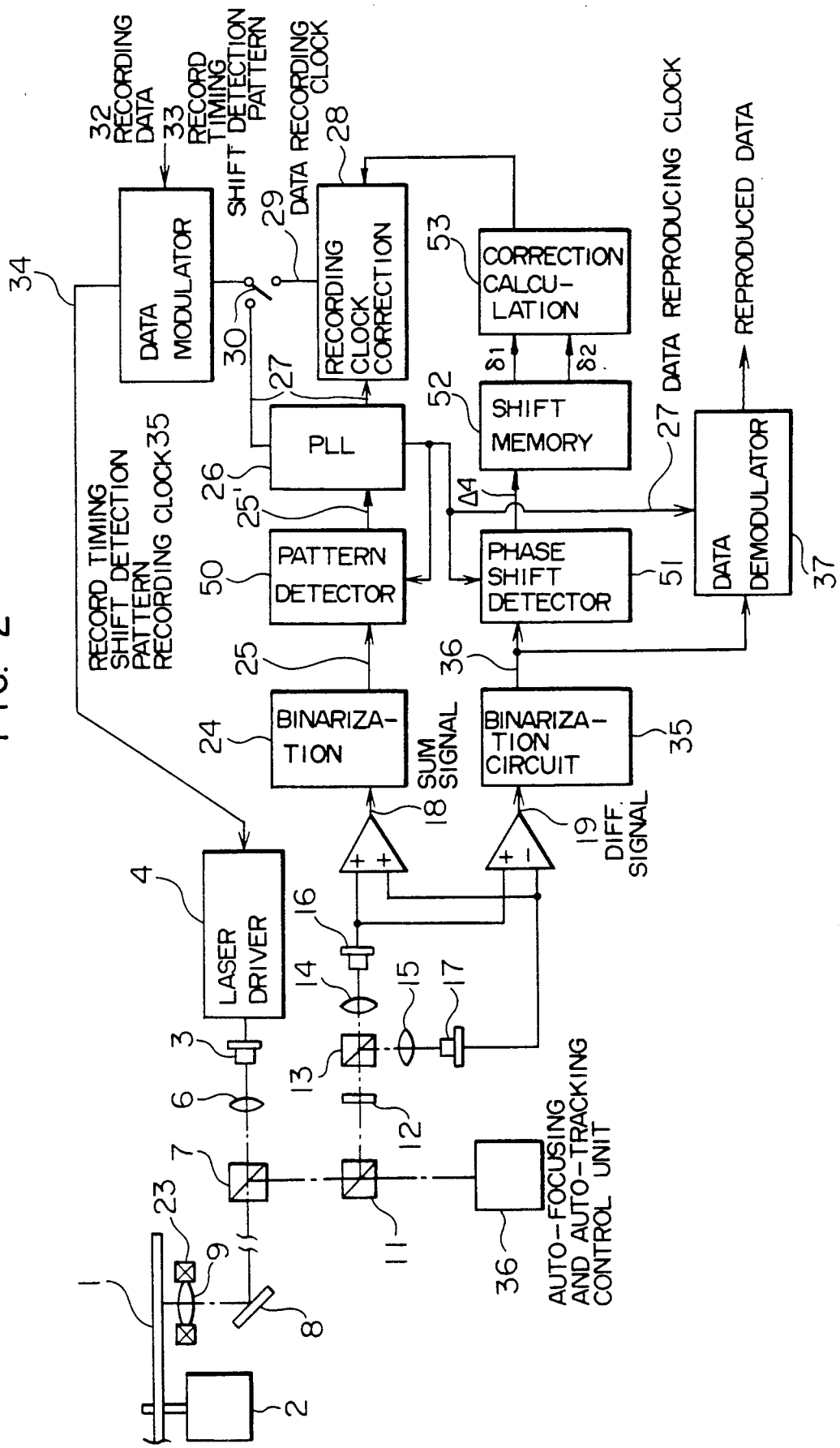
FIG. 2 shows a configuration of one embodiment of a magneto-optical disk unit of the present invention, illustrated for one beam.

FIG. 2 shows one embodiment of the magneto-optical disk system of the present invention, for one beam.

Figure 3:
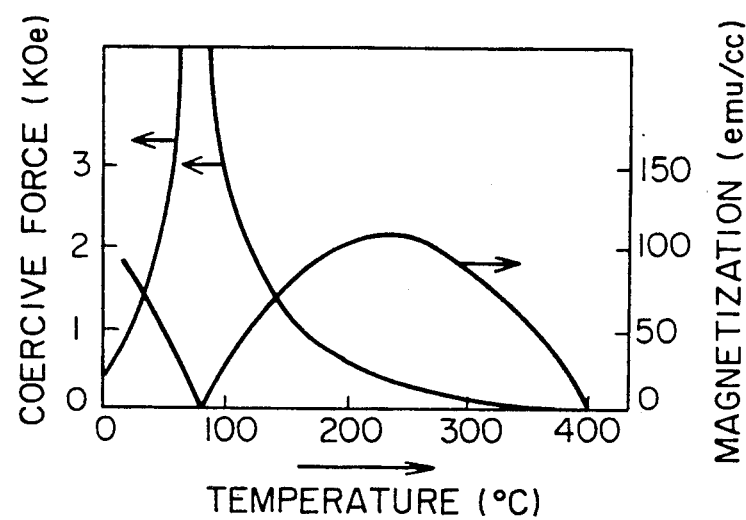
FIG. 3 shows temperature dependency of a coercive force and a saturated magnetization in a magneto-optical recording film in the embodiment.
Figure 4:
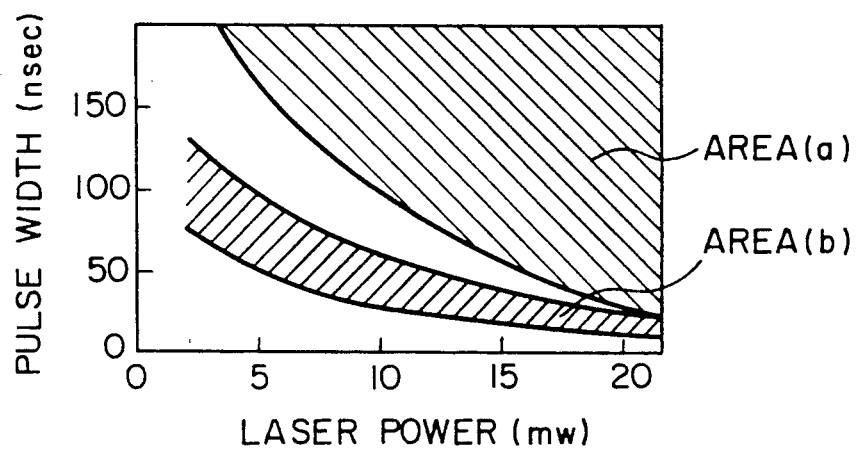
FIG. 4 shows a static recording characteristic of the magneto-optical recording film.

Numeral 1 denotes a magneto-optical disk having a vertical magnetization film which primarily consists of a TeFe element. It is sample formatted disk which has tracking pits and clock generating pits preformed. The magnetic film of the disk may be a $Gd_{15}Tb_7Co_{78}$ film. An example of a temperature dependency of the coercive force and the magnetization of the magnetic film is shown in FIG. 3. A Curie point of the magnetic film is 400° C., and a compensation temperature thereof is 70° C. A static record/erase characteristic thereof is shown in FIG. 4. Recording may be made in a region (a) in FIG. 4, and a recording magnetic domain prerecorded under a condition of 15 mW and 100 msec can be erased in a region (b). In a boundary region of the regions (a) and (b), the characteristic largely depends on a DC biasing magnetic field so that an optimum magnetic field for the recording may be selected. The following record test was conducted under the application of the biasing magnetic field of 500 Oe along the direction of magnetization beyond the compensation temperature of the medium. As a result, for a 3.5" disk at 1800 rpm, it has been found that an optimum recording condition is a laser output of 15 mW and a pulse width of 50 nsec as the long pulse, and a laser output of 15 mW and a pulse width of 20 nsec as the short pulse.

Figure 5:
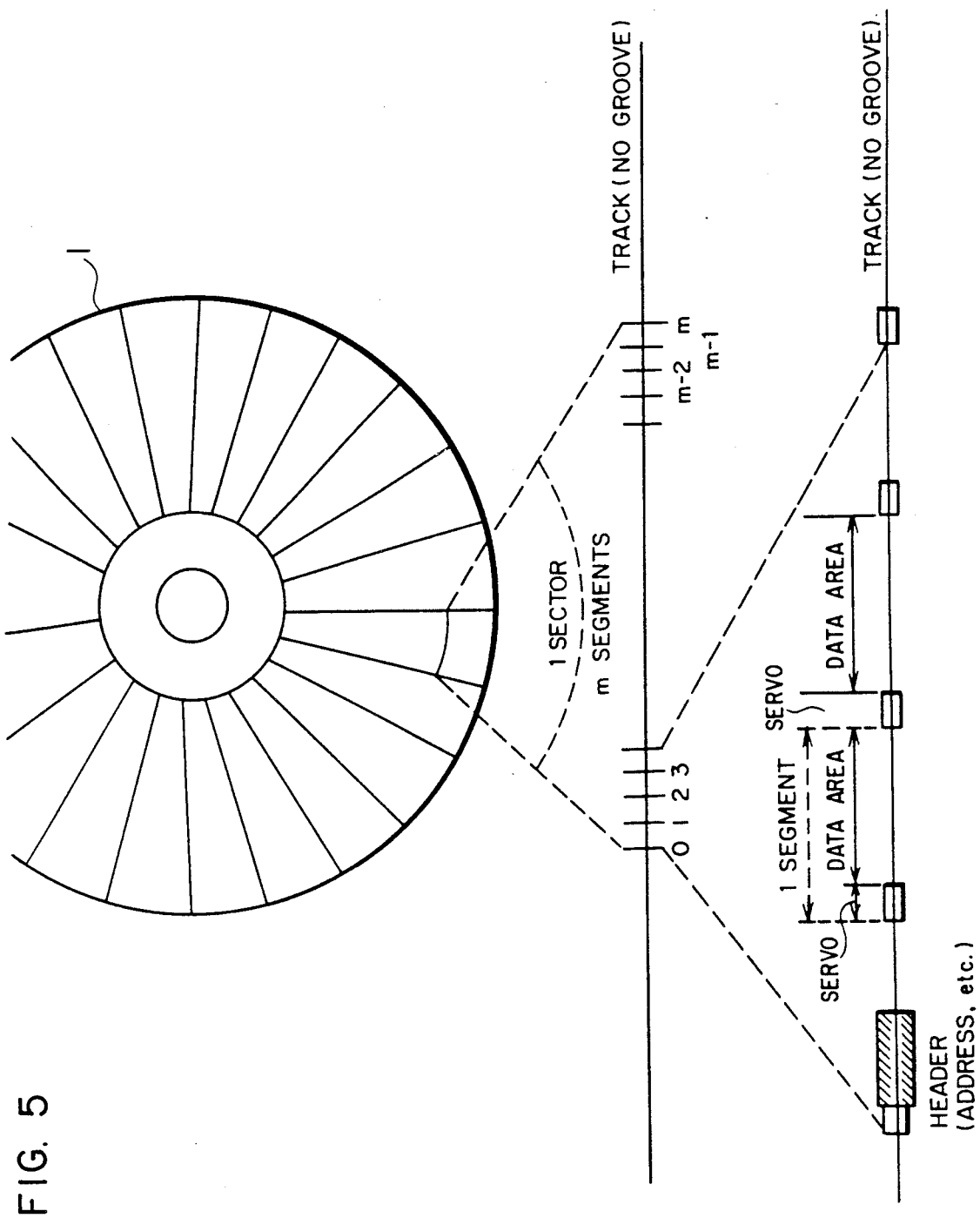
FIG. 5 shows a format of the magneto-optical disk used in the present invention.

As shown in FIG. 5, the disk 1 is divided into n sectors for each spiral or concentric track, and each sector is divided into m segments. Each segment is divided into a servo area having information for controlling the system prerecorded therein and a data recording area in which a user may record code data. Each servo area has buried clock pits for controlling the clock preformed therein. It is preferable that wobble pits for detecting the tracking signal are preformatted in the servo area together with the buried clock pits. It is also preferable to preformat a header signal such as address information in a top segment in each sector.

Turning back to FIG. 2, the disk 1 is rotated by a spindle motor 2. Data is recorded onto the disk 1 in the following manner. A semiconductor laser 3 is activated to emit a high power pulse light by a laser driver 4 in accordance with data to be recorded. The laser driver 4 causes the semiconductor laser 3 to emit the light continuously at the low power in the reproduction mode, and controls the laser power and the pulse width in the record mode such that the semiconductor laser 3 operates under one of the record conditions shown in FIGS. 1(a)-1(d), in accordance with the instruction from a record/reproduce control unit (not shown).

The light beam from the semiconductor laser 3 is collimated by a lens 6, then it passes through a beam splitter 7, is reflected normally by a galvanomirror 8, and focused into a fine spot having a diameter of approximately 1 μm on the recording film of the disk 1 by a focusing lens 9.

The reproduction of the data recorded on the disk 1 is no explained. The laser driver 4 causes the semiconductor laser 3 to emit a low power light under the instruction of the record/reproduce control unit. A polarization plane of the light from the semiconductor laser 3 is in one direction, and the light passes through the same light path as that in the record mode and is irradiated to the vertical magnetization film on the disk 1. The directions of magnetization of the vertical magnetization film are fixed upward or downward depending on the recorded data. By detecting the upward or downward direction of the magnetization, "1" or "0" of the recorded data is discriminated. The detection is effected by utilizing a Kerr effect which is one of the magneto-optical effects. In the Kerr effect, the polarization plane of the incident light is rotated to the left or right with respect to the original polarization plane depending on whether the direction of magnetization is upward or downward. The reflected light from the vertical magnetization film with the rotation of the polarization plane is reflected by a beam splitter 7 and separated from the light from the semiconductor laser 3. It is partially reflected by a beam splitter 11 and directed to a one-half wavelength plate 12, which is an optical element having a function to rotate the polarization plane by 45 degrees. The light having the polarization plane thereof rotated by 45 degrees is separated to a p-polarization component and a s-polarization component by a polarization beam splitter 13. They pass through lenses 14 and 15, respectively, and detected by photo-detectors 16 and 17, respectively. Only a change in the intensity of the light may be detected by summing the outputs of the photodetectors 16 and 17, irrespectively of the rotation of the polarization plane. By taking the difference of the outputs of the photodetectors 16 and 17, a change in the direction of magnetization can be detected as a signal change through the rotation of the polarization plane. A sum signal 18 may be detected as an optically separated signal of the pits preformed on the disk 1, and a difference signal 19 may be detected as an optically separated signal of the change in the direction of magnetization of the vertical magnetization film on the disk 1, that is, the recorded data. The light transmitted through the beam splitter 11 is directed to an auto-focusing and auto-tracking control unit 36 where it is used for controlling the light spot position.

Those servo techniques have been known and hence the explanation thereof is omitted. For example, the focusing control is described in U.S. Pat. No. 4,561,082 in which a non-record area for focusing control is provided in the servo area so that defocusing is detected by sampling, or U.S. Pat. No. 4,742,218 in which a light reflected from the disk is divided into two light beams, which are focused to photodetectors, respectively, and the defocusing state is detected by a difference between the outputs of the photodetectors, and the focusing lens is driven along the optical axis in accordance with the defocusing state. The tracking control is shown in U.S. Pat. No. 4,707,816 and U.S. Pat. No. 4,748,609 in which a tracking error is detected by using a pair of pits (wobble pits) wobbled on the left and right sides of the center line of the track. While not shown, the optical head comprising the laser light source, the optical system and the photodetectors is movable radially relative to of the disk 1.

Figure 10:
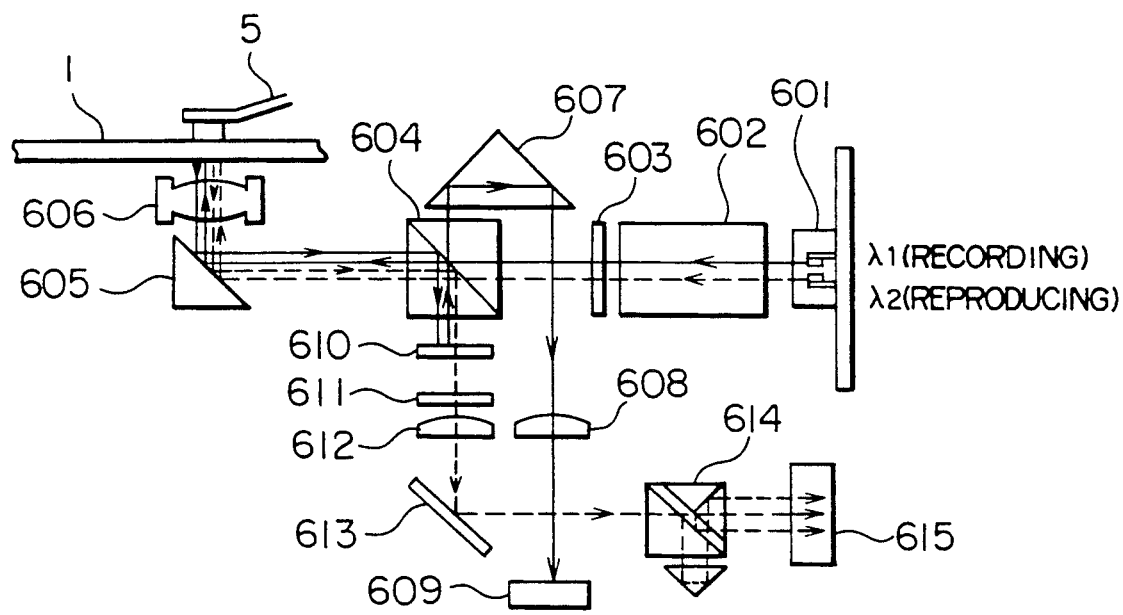
FIG. 10 shows an embodiment of a two-beam magneto-optical disk unit.

In the above embodiment, one beam is used. Another embodiment which uses two beams is now explained with reference to FIG. 10. As shown in FIG. 10, a recording beam and a reproducing beam are provided, and the reproducing beam is arranged immediately behind the recording beam in the data recording direction. The recording beam having a wavelength $\lambda_1$ emitted from a semiconductor laser 601 which can emit two beams is shown by a solid line light path. After it is collimated by a collimator lens 602, it passes through a one-half wavelength plate 603 and a beam splitter 604, and is reflected normally upward by a mirror 605 through a focusing lens to form a fine spot having a diameter of approximately 1 $\mu$m on a recording film of the disk 1. The light beam is modulated with a high power in the data record mode, and activated at a low power in other modes. The process in the record mode is similar to that for the one beam described above. Magnetic field application means 5 serves to apply the fixed biasing magnetic field described above. In the present invention, the overwriting may be attained without the biasing magnetic field depending on the magnetic characteristic of the magnetic film, but it is preferable to apply an optimum fixed biasing magnetic field to conform to the magnetic characteristic of the magnetic film. The beam reflected by the disk 1 again passes through the focusing lens 606, and passes through the mirror 605, the beam splitter 604 and a wavelength separation filter 610, and is reflected by a rectangular prism 607. It passes through a convex lens 608 and is directed to a photodetector 609. The wavelength separation filter 610 is designed to transmit the reproducing beam having the wavelength $\lambda_2$ therethrough and reflect the recording beam having the wavelength $\mu_1$. The power in the record mode is monitored and the clock is detected from the output from the photodetector 609. The process for generating the clock is described hereinafter. On the other hand, as shown by a broken line, the light path of the reproducing beam having the wavelength $\lambda_2$ reaches the wavelength separation filter 610 along a light path with is similar to that for the recording beam, passes through the wavelength separation filter 610, a one-half wavelength plate 611 and a convex lens 612, and is directed to a photodetector 615. A defocusing signal and a tracking error signal are detected from the output of the photodetector 615 to read the magneto-optical signal while effecting the automatic focusing control and the automatic tracking control. The process for preparing the magneto-optical signal has been described above. A technique for detecting the defocusing signal and the magneto-optical signal using the wavelength separation filter is described in U.S. Ser. No. 130,637 filed Dec. 9, 1987, now U.S. Pat. No. 4,873,678, assigned to the present assignee.

Figure 6:
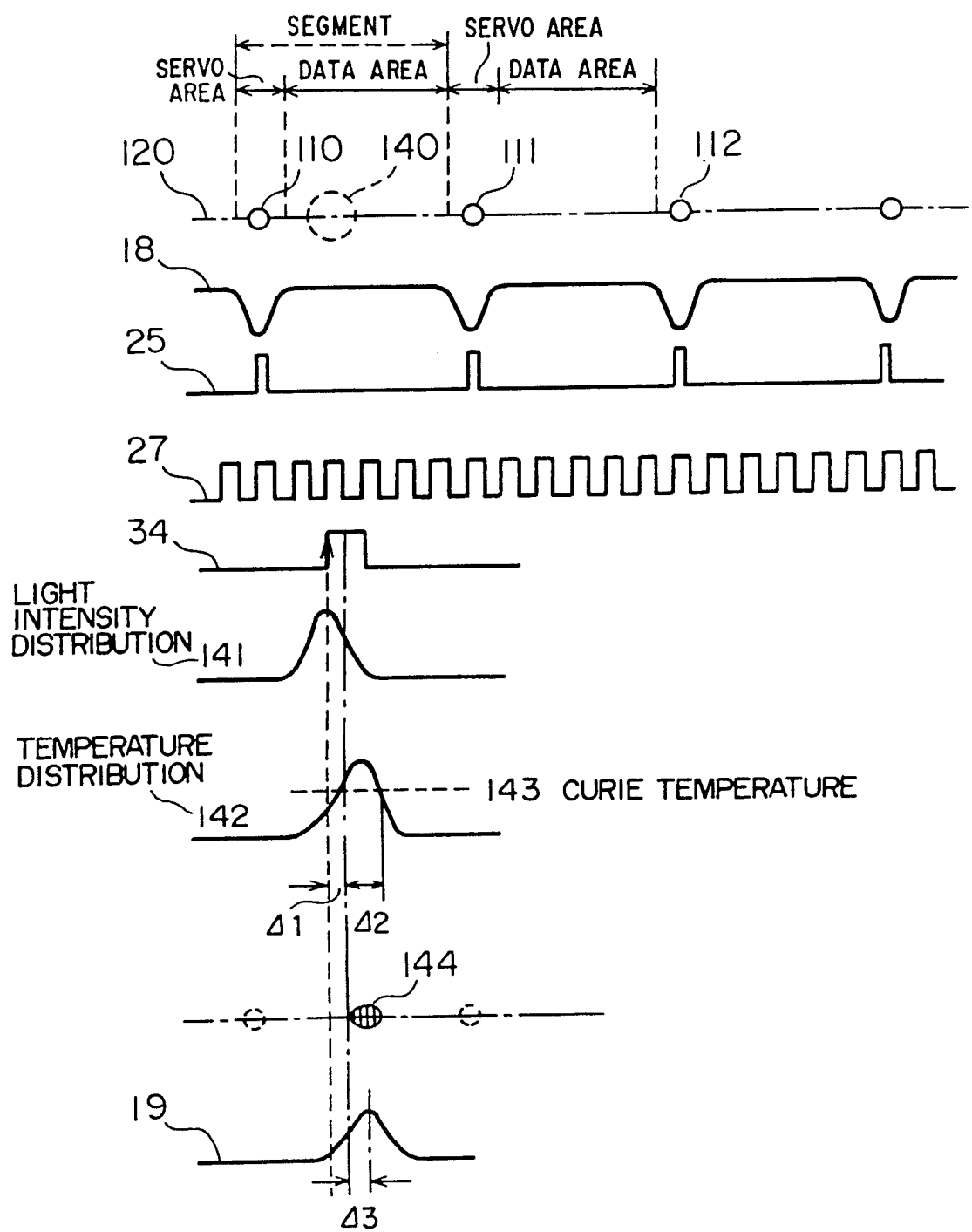
FIG. 6 shows a relationship between an overwrite timing and/a reproduced signal.

The record timing shift which poses a problem in the magneto-optical recording is now explained. FIG. 6 shows a relationship between the record timing in the overwriting and the reproduced signal. In FIG. 6, only the buried clock pits are preformatted in the servo area although the wobble pits for detecting the tracking signal may be preformatted in the servo area in addition to the buried clock pits. The wobble pits are equally shifted left and right with respect to the center line of the track, and the clock pits are arranged on the center line of the track. In this case, the tracking error signal as well as the clock signal can be detected from the servo area. An example of such preformatting is shown in FIG. 2 of "Formats for 5¼" optical disk system", (The Society of Photo-optical Instrumentation Engineers), Vol 695, Optical Mass Storage II (1986), pp. 239-242.

In the present invention, the record timing shift causes a problem but the tracking error signal is not an essential problem to the present invention. Accordingly, the embodiment shown in FIG. 6 in which only the clock pits are preformatted in the servo area is described below.

It is assumed that a light spot 140 is positioned at a time $t_0$ at a data record area on a track 120, that is, between pits 110 and 111. The sum signal 18 can detect only the signals of the pit columns 110-112. The sum signal 18 is supplied to a binarization circuit 24 having a predetermined threshold so that it produces a binarized pit signal 25. The pit signal 25 is supplied to a clock pattern detection circuit 50 which separates a spurious pulse signal generated by a defect of the disk and address signals prerecorded on the disk. In this manner, a pit signal 25' corresponding to the clock pits is generated. The pit signal 25' is supplied to a PLL circuit 26 as a phase reference signal to generate a clock 27. The PLL circuit 26 controls such that the clock 27 is generated only for a certain period determined between the pits. A technique for generating the clock signal from the buried clock pits is disclosed in U.S. Ser. No. 169,597 filed on Mar. 17, 1988 now U.S. Pat. No. 4,949,325, or U.S. Ser. No. 355,602 based on Japanese Patent Application No. 63-121734 dated May 20, 1988, both assigned to the present assignee.

The signal reproduced from the magnetic domain formed on the disk based on the recording pulse generated by the clock prepared based on the prepits 110, 111, 112 . . . is not in synchronism with the above clock but there is a time shift therebetween. The cause of the shift is explained below. When the binary signal 25' is detected from the prepits, a detection error $t_1$ occurs due to the effect of disk noise and level variation. The binary signal 25' is supplied to the PLL circuit 26 to generate the clock signal 27 which follows the time variation of the prepits. In this case, a follow error $t_2$ occurs because of a time variation due to a disk eccentricity and depending on the magnitude of rotation speed variation and the frequency band. The clock signal 27 from the PLL circuit 26 is further used to generate the recording pulse 34. Because it passes through several gates, there occurs a circuit delay $t_3$. In summary, there is a timing shift of $t_1+t_2+t_3$ between the prepits and the recording pulse.

When recording is done by using the above recording pulse, the magnetic domains formed are also time-shifted from the recording pulse. Major factors for determining the shape of magnetic domain are the temperature distribution and the magnetic characteristic of the medium. The temperature distribution depends on ⓐ the intensity distribution 141 of the light spot, ⓑ the linear velocity, ⓒ the thermal conductivity of the medium, and ⓓ the pulse irradiation time. The factor ⓐ is governed by the focusing characteristic, the residual aberration of the optical system, the coma aberration due to the inclination of the disk and the light emission distribution of the semiconductor laser. The temperature distribution is asymmetric by the effect of the linear velocity even if it is assumed that the light intensity distribution is symmetric as shown by 141 in FIG. 6. As a result, there occurs a shift of $\Delta 1$ between the leading edge of the magnetic domain 144 formed and the leading edge of the recording pulse. The length of the magnetic domain is selected on the basis of a certain threshold 143 which is determined by the temperature distribution 142 and the magnetic characteristic of the medium, and this length $\Delta 2$ is usually not equal to the width of the recording pulse. If the length of the magnetic domain formed is smaller than the diameter of the light spot 140, the read signal 19 exhibits a single-peak characteristic in which the signal is maximum or minimum at the center of the magnetic domain so that the center of the magnetic domain can be detected. The maximum or minimum point of the signal 19 and the mid-point of the pulse width of the recording pulse 34 are shifted from each other by $\Delta 3$.

When the recorded magnetic domain is reproduced, the shift between the prepits and the maximum or minimum point of the signal 19 is the sum of the shifts $t_1$, $t_2$, $t_3$ and $\Delta 3$ which have been introduced in the record mode, and a shift which will be introduced in the reproduce mode. The shift introduced in the reproduce mode includes the prepit detection error $t_1$, the PLL follow error $t_3$ and the maximum or minimum point detection error for the signal 19 $t_4$. Since $t_1$ and $t_3$ are not equal to $t_1$ and $t_3$, respectively, because of different conditions from those in the record mode, they are distinguished from $t_1$ and $t_3$. Of those, $t$, $t_1$ and $t_4$ may be neglected. They may be measured depending on the S/N ratios of the signals. Usually, they are sufficiently small if the S/N ratio is at least 30 dB.

Where the overwriting is done on the previously recorded magnetic domain, no problem will arise if the above shift does not vary with the operation conditions (temperature, variation of power supply and compatibility of the drive systems) even if such shift is included. However, judging from the above factors of the shift, there is no reason why the shift is constant. Even in one drive system, $t_3$ and $\Delta 3$ may vary if the disk is reloaded between the recording time and the overwriting time because the eccentricity changes, the rotation speed of the disk changes and the inclination of the disk changes. Further, if the drive system changes, $t_2$ and $\Delta 3$ change, particularly $\Delta 3$ changes significantly because the characteristic of the optical head and the characteristic of the mechanical unit change.

From the consideration to the shift, in order to form the additional magnetic domain exactly on the previously recorded magnetic domain in the overwrite mode, the reproduced signal from the previously recorded magnetic domain is detected immediately before the overwriting in the overwriting drive system, a shift $\delta_1$ from the clock generated from the prepits is detected by a phase shift detection circuit 51 to be described later, and the detected shift is supplied to a shift memory 52, because of possible change in time of the characteristic of the drive system or possible change of the drive system between the recording time and the overwriting time. Then, a predetermined record timing shift detection pattern 33 is recorded by the overwriting drive system immediately before the overwriting in a manner described below, the signal from the magnetic domain formed by said recording is immediately read, and the record timing shift $\delta_2$ is detected by the phase shift detection circuit 51 and it is supplied to the shift memory 52. A recording clock correction circuit 28 is controlled by an output of a correction calculation circuit 53 in the overwrite mode to generate a data recording clock 29 for the overwriting. In this manner, the precise overwriting is attained.

Figure 7:
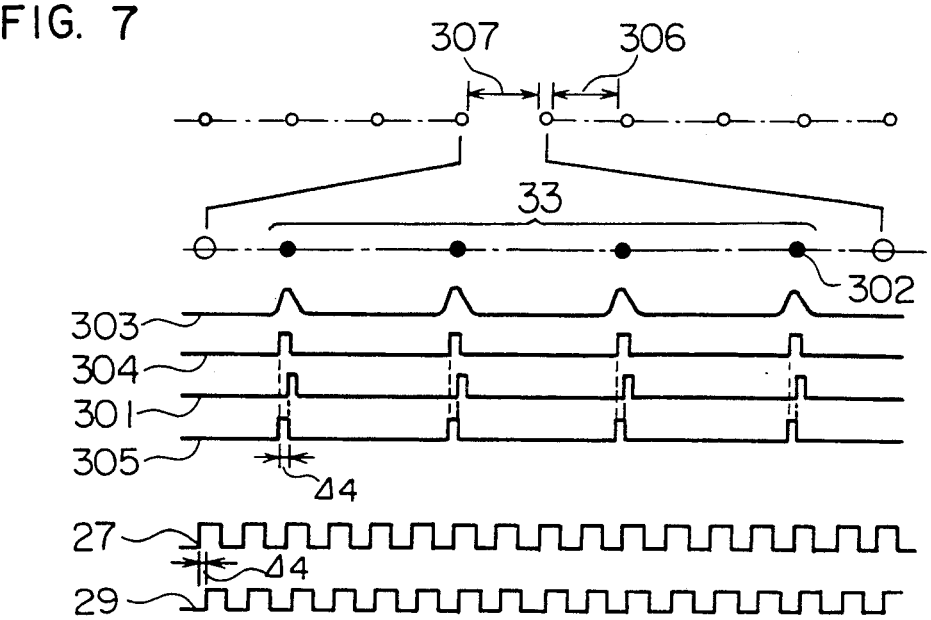
FIG. 7 shows a time chart of signals involved in detecting a phase shift between a recording magnetic domain and a reproduced clock.

A method for detecting the phase shift between the recording magnetic domain and the reproduced clock is now explained. FIG. 7 shows a time chart of the signals in detecting the phase shift of the reproduced clock. The process for generating the reproducing clock 27 is similar to that explained in connection with FIG. 6. A specific pattern 33 for detecting the record timing shift is recorded in a record area 307 preceding a data area 306 in which the data is to be recorded, prior to the code data to be recorded, by selecting a switch 30 and using the same record timing shift detection pattern recording clock 35 as the data reproducing clock 27 in order to form magnetization domains 302 corresponding to the specific pattern 33. It is read by the light spot to produce a signal 303, which is binarized by a certain threshold to produce a signal 304. The shift between the pulse signal 301 corresponding to the specific pattern 33 and the binary signal 304, that is, the record timing shift Δ4 is immediately detected (in the present instance, the reproduced signal is advanced relative to the recorded signal by Δ4), and the shift Δ4 is supplied to the shift memory 52. The shift Δ4 is equal to $\delta_1$ when the signal is detected from the previously recorded magnetic domain, and equal to $\delta_2$ immediately before the overwriting. The correction calculation circuit 53 sends the difference $\delta_1 - \delta_2$ with a sign to the recording clock correction circuit 28. The phase of the reproducing clock 27 is corrected by the difference $\delta_1 - \delta_2$ in the clock correction circuit 28 to produce the recording clock 29. The switch 30 is selected to record the data in the record areas 306, . . . following to the record area 307 in which the specific pattern 33 has been recorded, in response to the recording clock 29. In the reproduce mode, it is demodulated by the reproducing clock 27. In this manner, the record timing shift is corrected, the overwriting is precisely done, and NRZ (non-return to zero) modulation which is not a self-clocking type may be used as the data modulation system. The area in which the specific pattern for detecting the record timing shift is a overhead but a frequency of the detection of the record timing shift in one revolution of the disk is determined by the frequencies of a sensitivity variation and a magnetic field variation in one revolution of the disk. For an ordinary disk, it may be implemented for each sector of data. In this case, the area in which the specific pattern 33 is to be recorded may be arranged in a segment preceding to a preformatted ID area (header) which defines the top of the sector.

Figure 8:
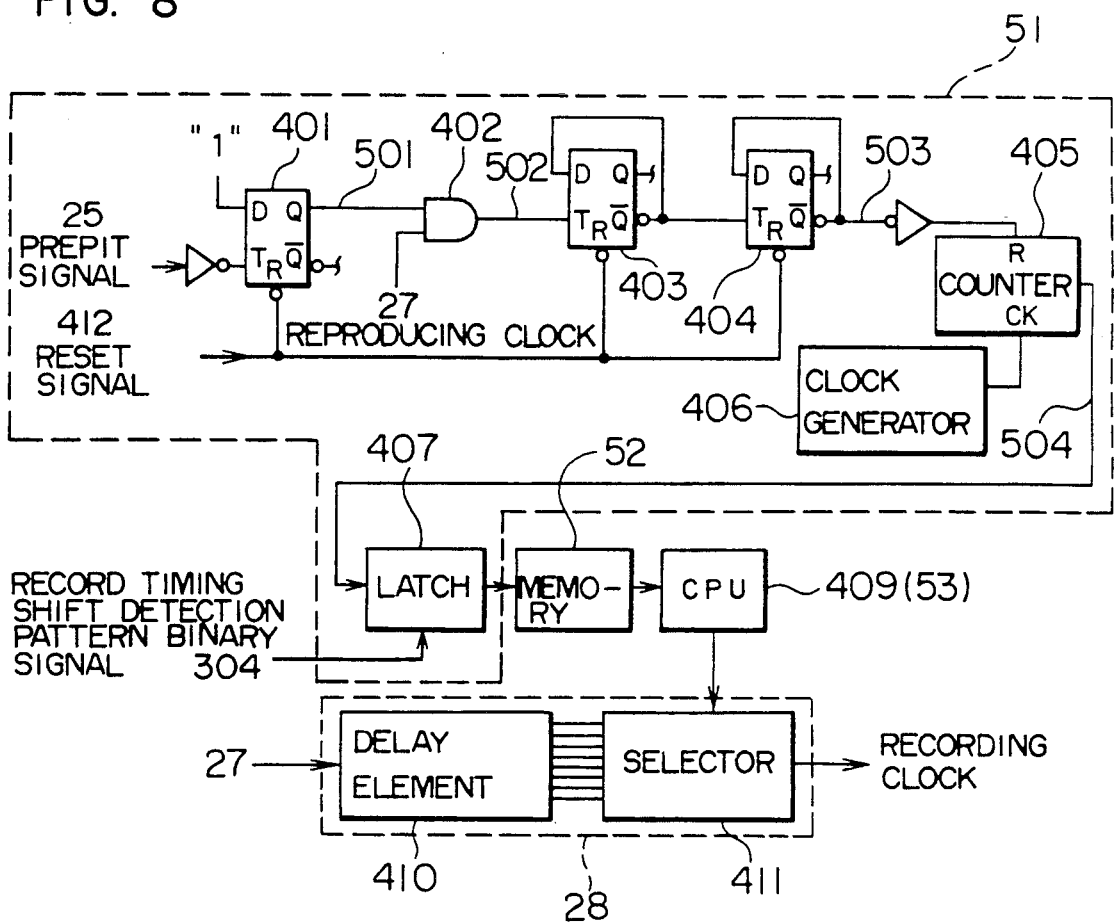
FIG. 8 shows a record clock correction circuit.
Figure 9:
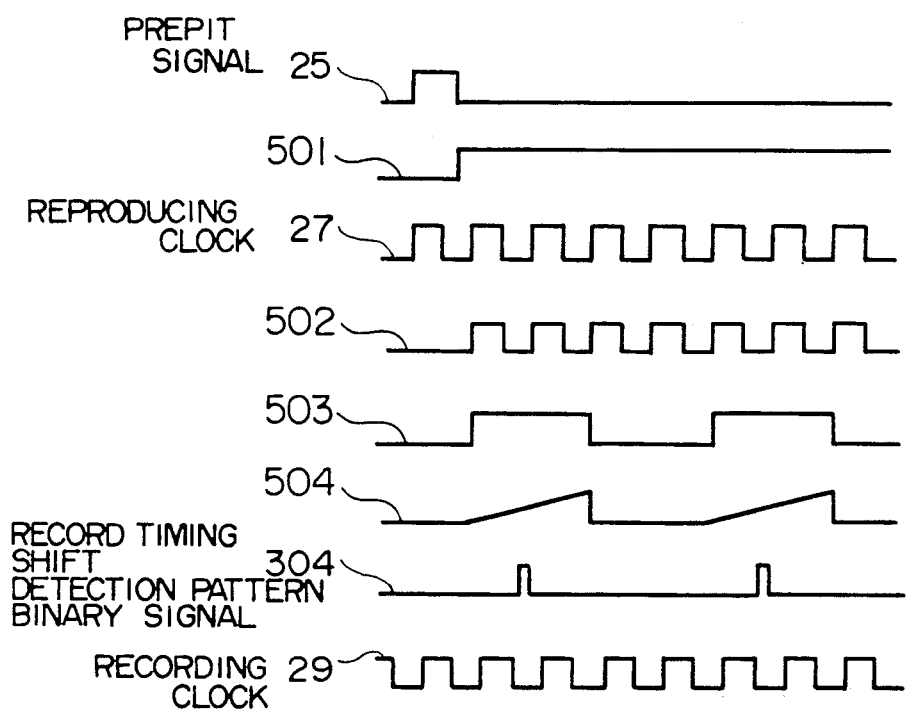
FIG. 9 shows a time chart for record clock correction.

The phase shift detection circuit 51 is now explained with reference to FIGS. 8 and 9. A signal 501 is produced by a flip-flop FF 401 based on the prepit signal 25 and it is supplied to an AND gate 402 which ANDs it with the reproducing clock 27 to produce a signal 502. The signal 502 is frequency-divided by a FF 403 and a FF 404 by a factor of four to produce a signal 503. The counter 405 is counted up by the signal 503. The counter 405 is incremented by the clock generator 406 as shown by a signal 504 in FIG. 9. The clock of the clock generator 406 is sufficiently faster than the reproducing clock 27 and the recording clock 29 so that a sufficient resolution is attained. The count of the counter 405 is latched into a latch circuit 407 by the binary signal 304 of the reproduced signal (magneto-optical signal) 303 corresponding to the record timing shift detection pattern recorded on the record area 307, and it is stored into the shift memory 52 which comprises memory elements. A plurality of stored counts are averaged by the correction calculation circuit 53 which comprises a CPU 409. This is done in order to average the variations due to the recording conditions. A plurality of clocks having different delay times produced by a delay element 410 based on the reproducing clock 27 are supplied to a selector 411, and one of them is selected in accordance with the output of the CPU 409 to produce the recording clock 29. The selector 411 selects the clock which corrects the recording clock by the shift between the irradiation timing of the recording radiation pulse and the formation timing for the magnetic domain, that is, the shift of the record timing. For example, if the recording is done Δt in advance, the clock whose phase retards from the reproducing clock 27 by as closely to Δt as possible is selected for the recording clock 29.

In order to detect the shift $\delta_1$ from the previously recorded magnetic domain, it is necessary that a pattern corresponding to the record timing shift detection pattern 33 is included in the recorded data. To this end, it is preferable to record the pattern corresponding to the record timing detection pattern 33 in the record area of the segment between the code data to be recorded and the ID area (header), by using the corrected recording clock 29. Since the record timing shift detection pattern 33 is the predetermined specific pattern, the allowable range of the record timing shift in the overwriting is narrow. There is no "1" to "0" overwriting but only "0" to "0" and "1" to "1" overwriting may occur. In case of overwriting of the record timing shift detection pattern, no problem will arise in the overwriting by the use of the clock 27 derived from the buried clock pits because the allowable range of the record timing shift is large as described above.

The recording clock correction circuit 28 maintains the corrected clock 29 during the data recording after the clock correction, and updates the content when it detects the record timing shift next time. In this manner, the record timing is corrected immediately before the recording so that the precise recording and reproduction of data are attained.

In the above embodiment, the magneto-optical disk system which uses one beam has been described. When one beam is used, it is necessary to detect the timing shift in the overwriting sector in order to measure the timing shift immediately before the overwriting. To this end, it is necessary to record at least the record timing shift detection pattern and reproduce it after one revolution to detect the timing shift. This increases the throughput time.

In order to solve the above problem, the magneto-optical disk system which uses two beams is utilized. In this system, the recording is effected by the preceding recording beam, and the shift of timing between the reproduced clock and the recording magnetic domain is detected by the succeeding reproducing beam. In this manner, the record timing shift can be exactly corrected without waiting for one disk revolution and hence the throughput is improved. Where two beams are used, the data in the sector which is immediately before the overwriting sector is read, the timing shift $\delta_1$ between the reproducing clock and the recorded magnetic domain is detected, the above pattern is recorded by the preceding beam in the area in the sector which is immediately before the overwriting sector, in which the record timing shift detection pattern is to be recorded, and the above record is read by the succeeding beam to detect the timing shift, and the record timing is immediately corrected by $\delta_1 - \delta_2$. In this manner, the overwriting may be effected without waiting for one revolution of the disk.

We claim:

1. A magneto-optical recording apparatus comprising:

a magneto-optical recording medium including a magnetic film having a magnetization direction which is normal to a plane of the magnetic film, the magneto-optical recording medium having a track and having optically detectable prepits preformed at predetermined intervals along the track, areas between the prepits constituting recording areas in which data is to be recorded in the form of magnetic domain formation areas and magnetic domain non-formation areas, the magneto-optical recording medium having a demagnetizing field enabling data recorded in the recording areas to be overwritten by other data;

prepit reproducing means for detecting the prepits on the magneto-optical recording medium and outputting a reproduced prepit signal representing the detected prepits;

clock signal generating means responsive to the reproduced prepit signal for generating a first clock signal synchronized with the reproduced prepit signal;

irradiating means for irradiating the magneto-optical recording medium with a radiation beam;

modulating means for modulating the radiation beam in accordance with an input signal and a clock signal to produce a radiation pulse having a large energy when a magnetic domain formation area is to be produced on the magneto-optical recording medium, and to produce a radiation pulse having a small energy when a magnetic domain non-formation area is to be produced on the magneto-optical recording medium;

pattern signal generating means for generating a pattern signal representing a predetermined pattern and for supplying the pattern signal and the first clock signal to the modulating means as the input signal and the clock signal of the modulating means to cause the predetermined pattern to be recorded in a first recording area of the recording areas on the magneto-optical recording medium;

pattern reproducing means for detecting the predetermined pattern in the first recording area on the magneto-optical recording medium and outputting a reproduced pattern signal representing the detected predetermined pattern;

code data reproducing means for detecting first code data previously recorded on a second recording area of the recording areas on the magneto-optical recording medium and outputting a reproduced code data signal representing the detected first code data;

phase difference detecting means for detecting a first phase difference between the reproduced pattern signal and the first clock signal and a second phase difference between the reproduced code data signal and the first clock signal and outputting a difference signal representing a difference between the first phase difference and the second phase difference;

clock signal correcting means for correcting the first clock signal in accordance with the difference signal outputted by the phase difference detecting means to produce a second clock signal; and code data signal generating means for generating a code data signal representing second code data and for supplying the code data signal and the second clock signal to the modulating means as the input signal and the clock signal of the modulating means to cause the second code data to be recorded in the second recording area over the first code data.

2. A magneto-optical recording apparatus according to claim 1, wherein the irradiating means comprises laser means for producing a laser beam, driving means for driving the laser means, an optical system for focusing the laser beam on the magneto-optical recording medium, and photoelectric converting means for converting light reflected from the magneto-optical recording medium to an electrical signal.

3. A magneto-optical recording apparatus according to claim 2, wherein the prepit reproducing means comprises means for detecting the prepits on the magneto-optical recording medium on the basis of the electrical signal produced by the photoelectric converting means, and wherein the clock signal generating means comprises phase-locked loop means.

4. A magneto-optical recording apparatus according to claim 1, wherein the clock signal correcting means comprises delay means for delaying the first clock signal to produce a plurality of delayed clock signals, and selecting means for selecting one of the delayed clock signals.

5. A magneto-optical recording apparatus according to claim 1, wherein the phase difference detecting means includes means for generating a third clock signal, counting means for counting the third clock signal, latch means for latching a first count of the counting means in response to the reproduced pattern signal and latching a second count of the counting means in response to the reproduced code data signal, storing means for storing the first count and the second count, and calculating means for calculating a difference between the first count and the second count stored in the storing means.

6. A magneto-optical recording apparatus according to claim 1, further comprising biasing magnetic field applying means for applying a fixed biasing magnetic field to the magneto-optical recording medium.

7. A magneto-optical recording apparatus according to claim 1, wherein the irradiating means includes means for irradiating the magneto-optical recording medium with a plurality of radiation beams at different positions along the track, wherein data recording is effected by a first radiation beam of the radiation beam and data reproducing is effected by a second radiation beam of the radiation beams, the first radiation beam preceding the second radiation beam with respect to motion of the magneto-optical recording medium.

8. A magneto-optical recording apparatus comprising:

a magneto-optical recording medium including a magnetic film having a magnetization direction which is normal to a plane of the magnetic film, the magneto-optical recording medium having a track and having optically detectable prepits preformed at predetermined intervals along the track, areas between the prepits constituting recording areas in which data is to be recorded in the form of magnetic domain formation areas and magnetic domain non-formation areas, the magneto-optical recording medium having a demagnetizing field enabling data recorded in the recording areas to be overwritten by other data;

prepit reproducing means for detecting the prepits on the magneto-optical recording medium and outputting a reproduced prepit signal representing the detected prepits;

clock signal generating means responsive to the reproduced prepit signal for generating a first clock signal synchronized with the reproduced prepit signal;

irradiating means for irradiating the magneto-optical recording medium with a radiation beam, the irradiating means including laser means for producing a laser beam, driving means for driving the laser means, and an optical system for focusing the laser beam on the magneto-optical recording medium;

modulating means for modulating the laser beam in accordance with an input signal and a clock signal to produce a laser pulse having a large energy when a magnetic domain formation area is to be produced on the magneto-optical recording medium, and to produce a laser pulse having a small energy when a magnetic domain non-formation area is to be produced on the magneto-optical recording medium;

pattern signal generating means for generating a pattern signal representing a predetermined pattern and for supplying the pattern signal and the first clock signal to the modulating means as the input signal and the clock signal of the modulating means to cause the predetermined pattern to be recorded in a first recording area of the recording areas on the magneto-optical recording medium;

pattern reproducing means for detecting the predetermined pattern in the first recording area on the magneto-optical recording medium and outputting a reproduced pattern signal representing the detected predetermined pattern;

code data reproducing means for detecting first code data previously recorded on a second recording area of the recording areas on the magneto-optical recording medium and outputting a reproduced code data signal representing the detected first code data;

phase difference detecting means for detecting a first phase difference between the reproduced pattern signal and the first clock signal and a second phase difference between the reproduced code data signal and the first clock signal and outputting a difference signal representing a difference between the first phase difference and the second phase difference;

clock signal correcting means for correcting the first clock signal in accordance with the difference signal outputted by the phase difference detecting means to produce a second clock signal; and code data signal generating means for generating a code data signal representing second code data and for supplying the code data signal and the second clock signal to the modulating means as the input signal and the clock signal of the modulating means to cause the second code data to be recorded in the second recording area over the first code data.

9. A magneto-optical recording apparatus according to claim 8, wherein the irradiating means further includes photoelectric converting means for converting light reflected from the magneto-optical recording medium to an electrical signal, wherein the prepit reproducing means comprises means for detecting the prepits on the magneto-optical recording medium on the basis of the electrical signal produced by the photoelectric converting means, and wherein the clock signal generating means comprises phase-locked loop means.

10. A magneto-optical recording apparatus according to claim 8, wherein the clock signal correcting means comprises delay means for delaying the first clock signal to produce a plurality of delayed clock signals, and selecting means for selecting one of the delayed clock signals.

11. A magneto-optical recording apparatus according to claim 8, wherein the phase difference detecting means includes means for generating a third clock signal, counting means for counting the third clock signal, latch means for latching a first count of the counting means in response to the reproduced pattern signal and latching a second count of the counting means in response to the reproduced code data signal, storing means for storing the first count and the second count, and calculating means for calculating a difference between the first count and the second count stored in the storing means.

12. A magneto-optical recording apparatus according to claim 8, wherein the irradiating means includes means for irradiating the magneto-optical recording medium with a plurality of laser beams at difference positions along the track, wherein data recording is effected by a first laser beam of the laser beams and data reproducing is effected by a second laser beam of the laser beams, the first laser beam preceding the second laser beam with respect to motion of the magneto-optical recording medium.

13. A magneto-optical recording method comprising the steps of:

preparing a magneto-optical recording medium including a magnetic film having a magnetization direction which is normal to a plane of the magnetic film, the magneto-optical recording medium having a track and having optically detectable prepits preformed at predetermined intervals along the track, areas between the prepits constituting recording areas in which data is to be recorded in the form of magnetic domain formation areas and magnetic domain non-formation areas, the magneto-optical recording medium having a demagnetizing field enabling data recorded in the recording areas to be overwritten by other data;

detecting the prepits on the magneto-optical recording medium and outputting a reproduced prepit signal representing the detected prepits;

generating, in response to the reproduced prepit signal, a first clock signal synchronized with the reproduced prepit signal;

irradiating the magneto-optical recording medium with a radiation beam;

generating a pattern signal representing a predetermined pattern and modulating the radiation beam in accordance with the pattern signal and the first clock signal to cause the predetermined pattern to be recorded in a first recording area of the recording areas on the magneto-optical recording medium;

detecting the predetermined pattern in the first recording area on the magneto-optical recording medium and outputting a reproduced pattern signal representing the detected predetermined pattern;

detecting first code data previously recorded on a second recording area of the recording areas on the magneto-optical recording medium and outputting a reproduced code data signal representing the detected first code data;

detecting a first phase difference between the reproduced pattern signal and the first clock signal and a second phase difference between the reproduced code data signal and the first clock signal and outputting a difference signal representing a difference between the first phase difference and the second phase difference;

correcting the first clock signal in accordance with the difference signal to produce a second clock signal; and generating a code data signal representing second code data and modulating the radiation beam in accordance with the code data signal and the second clock signal to cause the second code data to be recorded in the second recording area over the first code data;

wherein modulating the radiation beam produces a radiation pulse having a large energy when a magnetic domain formation area is to be produced on the magneto-optical recording medium, and produces a radiation pulse having a small energy when a magnetic domain non-formation area is to be produced on the magneto-optical recording medium.

14. A magneto-optical recording method according to claim 13, wherein the irradiating step includes irradiating the magneto-optical recording medium with a plurality of radiation beams at different positions along the track, wherein the recording is effected by a first radiation beam of the radiation beams and data reproducing is effected by a second radiation beam of the radiation beams, the first radiation beam preceding the second radiation beam with respect to motion of the magneto-optical recording medium.

* * * * *